United States Patent
Suzuki

(10) Patent No.: US 12,193,371 B2
(45) Date of Patent: Jan. 14, 2025

(54) HEDGE TRIMMER

(71) Applicant: MAKITA CORPORATION, Anjo (JP)

(72) Inventor: Masahiro Suzuki, Anjo (JP)

(73) Assignee: MAKITA CORPORATION, Anjo (JP)

( * ) Notice: Subject to any disclaimer, the term of this patent is extended or adjusted under 35 U.S.C. 154(b) by 529 days.

(21) Appl. No.: 17/455,330

(22) Filed: Nov. 17, 2021

(65) Prior Publication Data

US 2022/0174879 A1 Jun. 9, 2022

(30) Foreign Application Priority Data

Dec. 4, 2020 (JP) ................................ 2020-202038

(51) Int. Cl.
*A01G 3/053* (2006.01)
*A01G 3/047* (2006.01)
*A01G 3/04* (2006.01)

(52) U.S. Cl.
CPC ........... *A01G 3/053* (2013.01); *A01G 3/0475* (2013.01); *A01G 2003/0461* (2013.01)

(58) Field of Classification Search
CPC ...... A01G 3/047; A01G 3/0475; A01G 3/053; A01G 2003/0461
USPC ........................................... 30/132, 208–210
See application file for complete search history.

(56) References Cited

U.S. PATENT DOCUMENTS

| | | | | |
|---|---|---|---|---|
| 2,281,189 A * | 4/1942 | Wright | ................... | A01G 3/053 30/132 |
| 2,510,311 A * | 6/1950 | Greene | ................... | A01G 3/053 30/132 |
| 2,633,636 A * | 4/1953 | Szostek | ................... | A01G 3/053 30/216 |
| 2,747,276 A * | 5/1956 | Yatsko | ................... | A01G 3/053 30/132 |
| 3,073,025 A * | 1/1963 | Yatsko | ................... | A01G 3/053 30/132 |
| 3,552,013 A * | 1/1971 | Stone | ................... | A01G 3/053 30/132 |
| 3,795,050 A * | 3/1974 | Latsha | ................... | A01G 3/053 30/132 |

(Continued)

FOREIGN PATENT DOCUMENTS

| | | | | |
|---|---|---|---|---|
| DE | 1582832 A1 * | 8/1970 | ............. | A01G 3/053 |
| DE | 1632895 A1 * | 1/1971 | ............. | A01G 3/053 |

(Continued)

*Primary Examiner* — Jason Daniel Prone
(74) *Attorney, Agent, or Firm* — Sughrue Mion, PLLC

(57) ABSTRACT

A hedge trimmer may include a body housing, a fixed plate, a blade and a chip receiver. A first engaged part may be disposed on a first side surface of the fixed plate and a second engaged part may be disposed on a second side surface of the fixed plate. The chip receiver may include a base part mounted on the fixed plate, a receiving part and an attachment part. The attachment part may include first engaging part, a second engaging part configured to be movable between an engaging position and a non-engaging position, and a manipulation part configured to move the second engaging part from the engaging position to the non-engaging position in response to a user operation. An upper surface of the base part is flat.

6 Claims, 11 Drawing Sheets

(56) References Cited

U.S. PATENT DOCUMENTS

| | | | | |
|---|---|---|---|---|
| 3,916,521 | A * | 11/1975 | Sekelsky | A01G 3/053 30/132 |
| 3,990,145 | A * | 11/1976 | Rubin | A01G 3/053 30/233 |
| 4,071,951 | A * | 2/1978 | Burns | A01G 3/053 30/132 |
| 4,127,938 | A * | 12/1978 | Slingerland, Jr. | A01G 3/062 30/132 |
| 5,048,277 | A * | 9/1991 | Trimarco | A01G 3/053 56/DIG. 4 |
| D335,247 | S * | 5/1993 | Gittery | D8/8 |
| D351,537 | S * | 10/1994 | Yagin | D8/1 |
| 5,653,029 | A * | 8/1997 | Shigenaka | A01G 3/053 30/132 |
| 5,659,958 | A * | 8/1997 | Goings | A01G 3/053 30/216 |
| 7,155,830 | B2 * | 1/2007 | Sasaki | A01G 3/053 30/208 |
| 8,042,275 | B2 * | 10/2011 | Sergyeyenko | A01G 3/053 30/132 |
| 8,307,554 | B1 * | 11/2012 | Lambert | A01G 3/053 30/132 |
| 9,113,602 | B2 * | 8/2015 | Hachisuka | A01G 3/053 |
| 11,844,317 | B2 * | 12/2023 | Suzuki | A01G 3/053 |

FOREIGN PATENT DOCUMENTS

| | | | | |
|---|---|---|---|---|
| DE | 2154793 | A1 * | 5/1973 | A01G 3/053 |
| DE | 9200504 | U1 * | 6/1992 | A01G 3/047 |
| DE | 202018006479 | U1 * | 10/2020 | A01G 3/053 |
| EP | 1 911 344 | A2 | 4/2008 | |
| FR | 2494551 | A1 * | 5/1982 | A01G 3/053 |
| GB | 2289203 | A * | 11/1995 | A01G 3/053 |
| GB | 2305841 | A * | 4/1997 | A01G 3/053 |
| GB | 2333940 | A * | 8/1999 | A01G 3/053 |
| JP | 2010178660 | A * | 8/2010 | A01G 3/053 |
| JP | 2010178661 | A * | 8/2010 | A01G 3/053 |
| JP | 4976122 | B2 | 7/2012 | |
| JP | 2021058138 | A * | 4/2021 | A01G 3/053 |
| JP | 2021058139 | A * | 4/2021 | A01G 3/053 |
| WO | WO-2017088912 | A1 * | 6/2017 | A01G 3/053 |

* cited by examiner (Variant)

HEDGE TRIMMER

CROSS-REFERENCE TO RELATED APPLICATION

This application claims priority to Japanese Patent Application No. 2020-202038 filed on Dec. 4, 2020, the contents of which are hereby incorporated by reference into the present application.

TECHNICAL FIELD

The disclosure herein relates to a hedge trimmer.

BACKGROUND ART

Japanese Patent Application Publication No. 2008-113651 describes a hedge trimmer that includes a body housing, a fixed plate attached to the body housing and extending forward from a front part of the body housing, a blade attached to the fixed plate, configured to be movable in a front-rear direction with respect to the fixed plate and extending forward from the front part of the body housing, and a chip receiver detachably attached to the fixed plate. A first engaged part is disposed on a left side surface of the fixed plate, and a second engaged part is disposed on a right side surface of the fixed plate. The chip receiver includes a base part mounted on the fixed plate, a receiving part connected to the base part and configured to receive cut branches and leaves, and an attachment part configured to attach the chip receiver to the fixed plate. The attachment part includes a first engaging part fixed to the base part and configured to engage with the first engaged part, a second engaging part supported by the receiving part and configured to be movable between an engaging position in which the second engaging part is engaged with the second engaged part and a non-engaging position in which the second engaging part is not engaged with the second engaged part, and a manipulation part configured to move the second engaging part from the engaging position to the non-engaging position in response to a user operation. A flat part and a protruding part that protrudes upward are disposed on an upper surface of the base part.

SUMMARY

The hedge trimmer of Japanese Patent Application Publication 2008-113651 has the protruding part disposed on the upper surface of the base part of the chip receiver. In this case, the branches and leaves cut by the blade collide with the protruding part prior to entering the receiving part. Due to this, among the branches and leaves cut by the blade, the branches and leaves that collided with the protruding part could scatter on ground. The disclosure herein provides art that can reduce amounts of branches and leaves that scatter on ground among branches and leaves cut by a blade.

A hedge trimmer disclosed herein may comprise: a body housing; a fixed plate attached to the body housing and extending forward from a front part of the body housing; a blade attached to the fixed plate, configured to be movable in a front-rear direction with respect to the fixed plate and extending forward from the front part of the body housing; and a chip receiver detachably attached to the fixed plate, wherein a first engaged part is disposed on a first side surface, the first side surface being one of a left side surface of the fixed plate and a right side surface of the fixed plate, and a second engaged part is disposed on a second side surface, the second surface being the other of the left side surface and the right side surface, wherein the chip receiver comprises: a base part mounted on the fixed plate; a receiving part connected to the base part and configured to receive cut branches and leaves; and an attachment part configured to attach the chip receiver to the fixed plate, wherein the attachment part comprises: a first engaging part fixed to the base part or the receiving part and configured to engage with the first engaged part, a second engaging part supported by the base part or the receiving part and configured to be movable between an engaging position in which the second engaging part is engaged with the second engaged part and a non-engaging position in which the second engaging part is not engaged with the second engaged part, and a manipulation part configured to move the second engaging part from the engaging position to the non-engaging position in response to a user operation, wherein an upper surface of the base part is flat. "Flat" as described herein means that members such as a rib or a protruding part that interrupts the branches and leaves cut by the blade from entering the receiving part are not disposed on the upper surface of the base part. That is, "flat" encompasses configurations in which a rib or a protruding part with a size that does not interrupt the branches and leaves cut by the blade from entering the receiving part is disposed on the upper surface of the base part.

According to the above configuration, due to the upper surface of the base part being flat, the branches and leaves cut by the blade are not interrupted from entering the receiving part. Thus, most of the branches and leaves cut by the blade can be received by the receiving part. As a result of this, amounts of branches and leaves that scatter on ground can be reduced.

DETAILED DESCRIPTION

Figure 1:
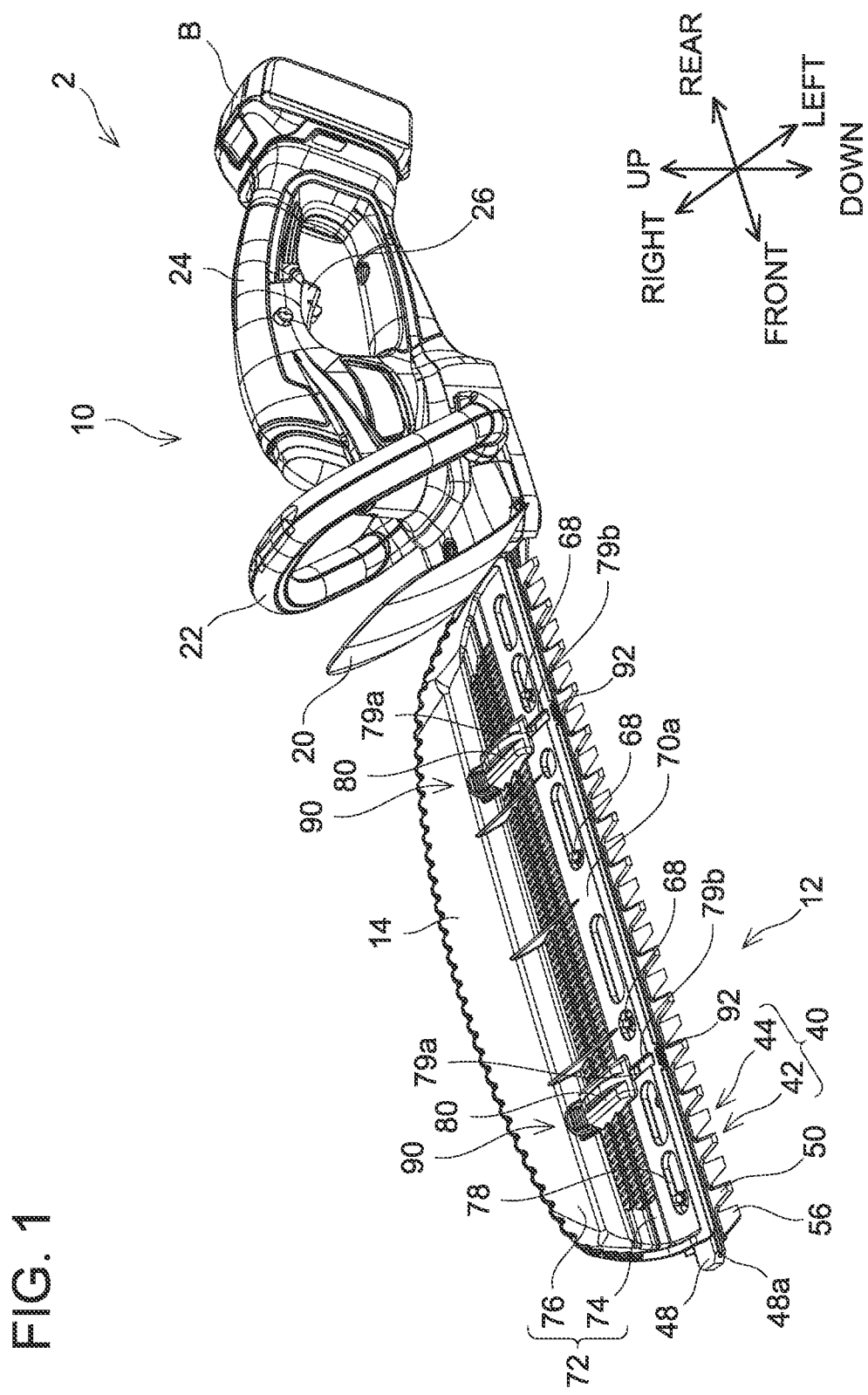
FIG. 1 is a perspective view of a hedge trimmer 2 of an embodiment as viewed from the upper front left side.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved hedge trimmers, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a hedge trimmer may comprise: a body housing; a fixed plate attached to the body housing and extending forward from a front part of the body housing; a blade attached to the fixed plate, configured to be movable in a front-rear direction with respect to the fixed plate and extending forward from the front part of the body housing; and a chip receiver detachably attached to the fixed plate, wherein a first engaged part is disposed on a first side surface, the first side surface being one of a left side surface of the fixed plate and a right side surface of the fixed plate, and a second engaged part is disposed on a second side surface, the second surface being the other of the left side surface and the right side surface, wherein the chip receiver comprises: a base part mounted on the fixed plate; a receiving part connected to the base part and configured to receive cut branches and leaves; and an attachment part configured to attach the chip receiver to the fixed plate, wherein the attachment part comprises: a first engaging part fixed to the base part or the receiving part and configured to engage with the first engaged part, a second engaging part supported by the base part or the receiving part and configured to be movable between an engaging position in which the second engaging part is engaged with the second engaged part and a non-engaging position in which the second engaging part is not engaged with the second engaged part, and a manipulation part configured to move the second engaging part from the engaging position to the non-engaging position in response to a user operation, wherein an upper surface of the base part is flat.

In one or more embodiments, the manipulation part may be disposed at the receiving part.

In a configuration in which the manipulation part is disposed at the base part, it is possible that the branches and leaves cut by the blade collide with the manipulation part and the branches and leaves that collided with the manipulation part scatter on ground. According to the above configuration, the branches and leaves cut by the blade can be suppressed from colliding with the manipulation part before they enter the receiving part. Thus, amounts of branches and leaves that scatter on the ground can be reduced.

Further, in the configuration in which the manipulation part is disposed at the base part, it is possible that branches come into contact with the manipulation part and the second engaging part is thereby moved from the engaging position to the non-engaging position. If this happens, the chip receiver would be detached from the fixed plate during trimming. According to the above configuration, the branches can be suppressed from coming into contact with the manipulation part during the trimming. Thus, the chip receiver can be suppressed from detaching from the fixed plate during the trimming.

In one or more embodiments, the receiving part may be disposed on a second surface side with respect to the base part, and the second engaging part may be disposed at the receiving part of the chip receiver.

The branches and leaves cut by the blade are more likely to collide with the base part when a thickness of the base part is larger, and the amounts of the branches and leaves that scatter on the ground would thereby increase. Due to this, it is desirable that the thickness of the base part is small. If the manipulation part is disposed at the receiving part and the second engaging part is disposed at the base part, a coupling part for coupling the manipulation part and the second engaging part needs to be provided, as a result of which the thickness of the base part becomes larger by a size of the coupling part. According to the above configuration, there is no need to dispose the coupling part for coupling the manipulation part and the second engaging part. Due to this, the thickness of the base part can be made small. Thus, amounts of the branches and leaves coming into contact with the base part can be reduced and the amounts of the branches and leaves that scatter on the ground can be reduced.

In one or more embodiments, the first engaging part may be integrally formed with the base part.

The branches and leaves cut by the blade are more likely to collide with the base part when the thickness of the base part is larger, and the amounts of the branches and leaves that scatter on the ground would thereby increase. Due to this, it is desirable that the thickness of the base part is small. If the first engaging part is fixed to the base part via a fastener, a fastening hole needs to be defined in the base part, as a result of which the thickness of the base part becomes larger. According to the above configuration, there is no need to define the fastening hole in the base part. Due to this, the thickness of the base part can be made small. Thus, the amounts of the branches and leaves coming into contact with the base part can be reduced and the amounts of the branches and leaves that scatter on the ground can be reduced. Further, since the fastener does not need to be used, the number of components of the hedge trimmer can be reduced.

In one or more embodiments, the manipulation part may be configured to be manipulable along a first direction orthogonal to the front-rear direction. The second engaging part may be configured to move along the first direction when the manipulation part is manipulated in the first direction.

According to the above configuration, the direction along which the manipulation part is manipulated matches the direction along which the second engaging part moves. Due to this, a user can easily recognize the moving direction of the second engaging part. Thus, manipulation of the hedge trimmer can be improved.

EMBODIMENT

A hedge trimmer 2 will be described with reference to the drawings. The hedge trimmer 2 is a gardening electric tool used for trimming hedges and the like. As shown in FIG. 1, the hedge trimmer 2 comprises a body housing 10, a blade unit 12 attached to the body housing 10, and a chip receiver 14. The chip receiver 14 is a member having a shape like a saucer and receives branches and leaves cut by the blade unit 12. In the following description, a longitudinal direction of the blade unit 12 will be termed a front-rear direction, a direction along which blade edges 50, 56 of the blade unit 12 extend will be termed a left-right direction, and a direction orthogonal to the front-rear direction and to the left-right direction will be termed an up-down direction.

(Configuration of Body Housing 10)

Figure 2:
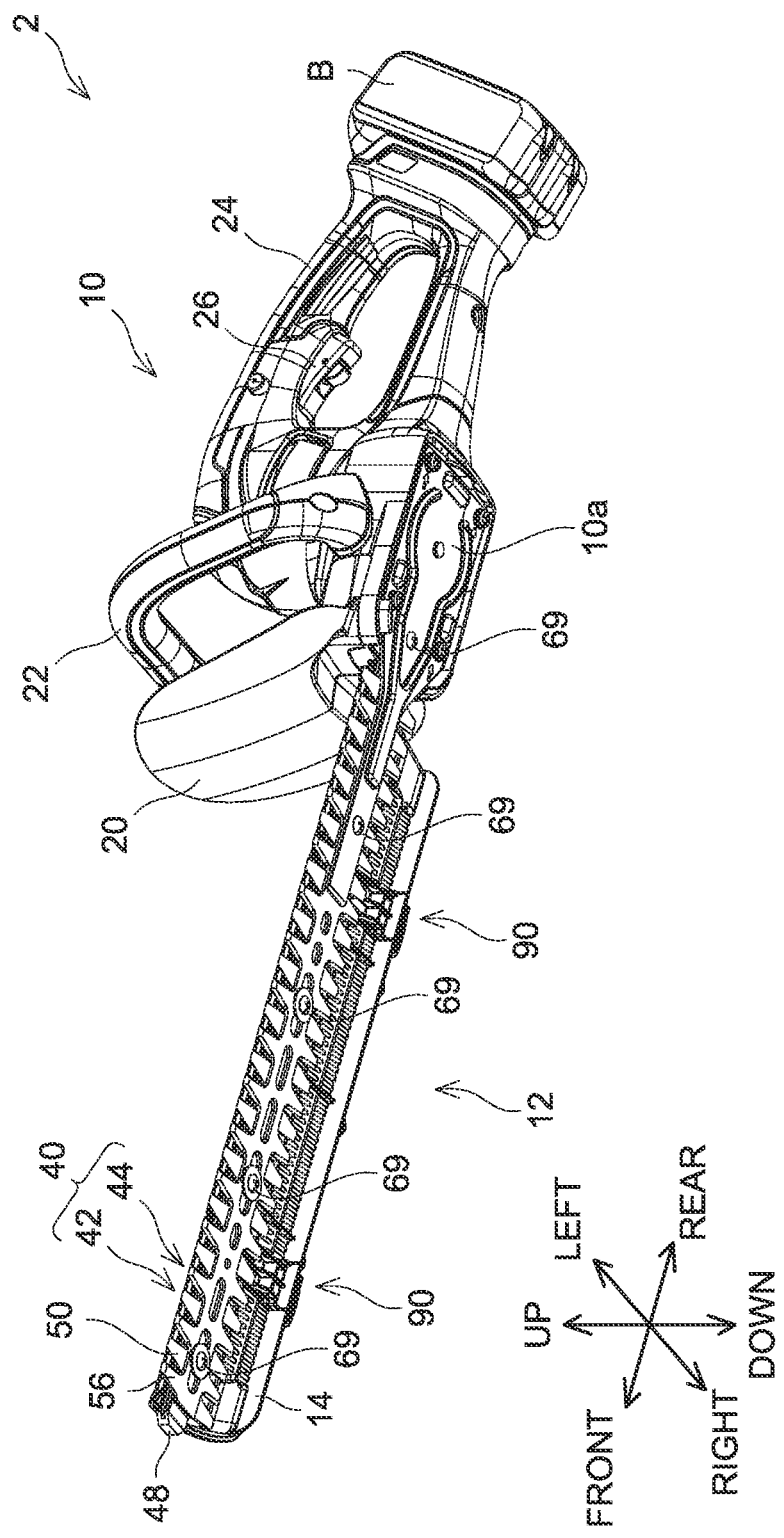
FIG. 2 is a perspective view of the hedge trimmer 2 of the embodiment as viewed from the lower front left side.
Figure 9:
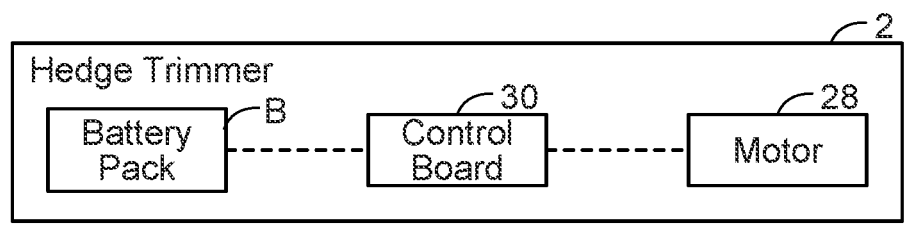
FIG. 9 is a diagram showing an electrical configuration of the hedge trimmer 2 of the embodiment.

The body housing 10 has a chip guard 20, a front handle 22, and a rear handle 24 disposed thereon. The chip guard 20 is disposed at a front part of the body housing 10 and is configured to guard against the cut branches and leaves scattering rearward. The front handle 22 is disposed rearward of the chip guard 20. The rear handle 24 is disposed at a rear part of the body housing 10. The front handle 22 and the rear handle 24 are configured to be gripped by the user. The hedge trimmer 2 is a handheld electric tool and normally, the user uses the hedge trimmer 2 by holding the front handle 22 by his/her left hand and the rear handle 24 by his/her right hand. An actuation lever 26 is disposed on the rear handle 24. A battery pack B is detachably attached to the rear part of the body housing 10. The body housing 10 accommodates a motor 28 (see FIG. 9) and a control board 30 (see FIG. 9) configured to control actuation of the motor 28. The control board 30 is configured to control operations of the motor 28 by controlling power supplied from the battery pack B to the motor 28. When the actuation lever 26 is pulled by a finger of the hand gripping the rear handle 24, the power is supplied from the battery pack B to the motor 28 and the motor 28 thereby actuates the blade unit 12. As shown in FIG. 2, a front-extending part 10a extending forward is attached to a lower part of the body housing 10.

(Configuration of Blade Unit 12)

Figure 3:
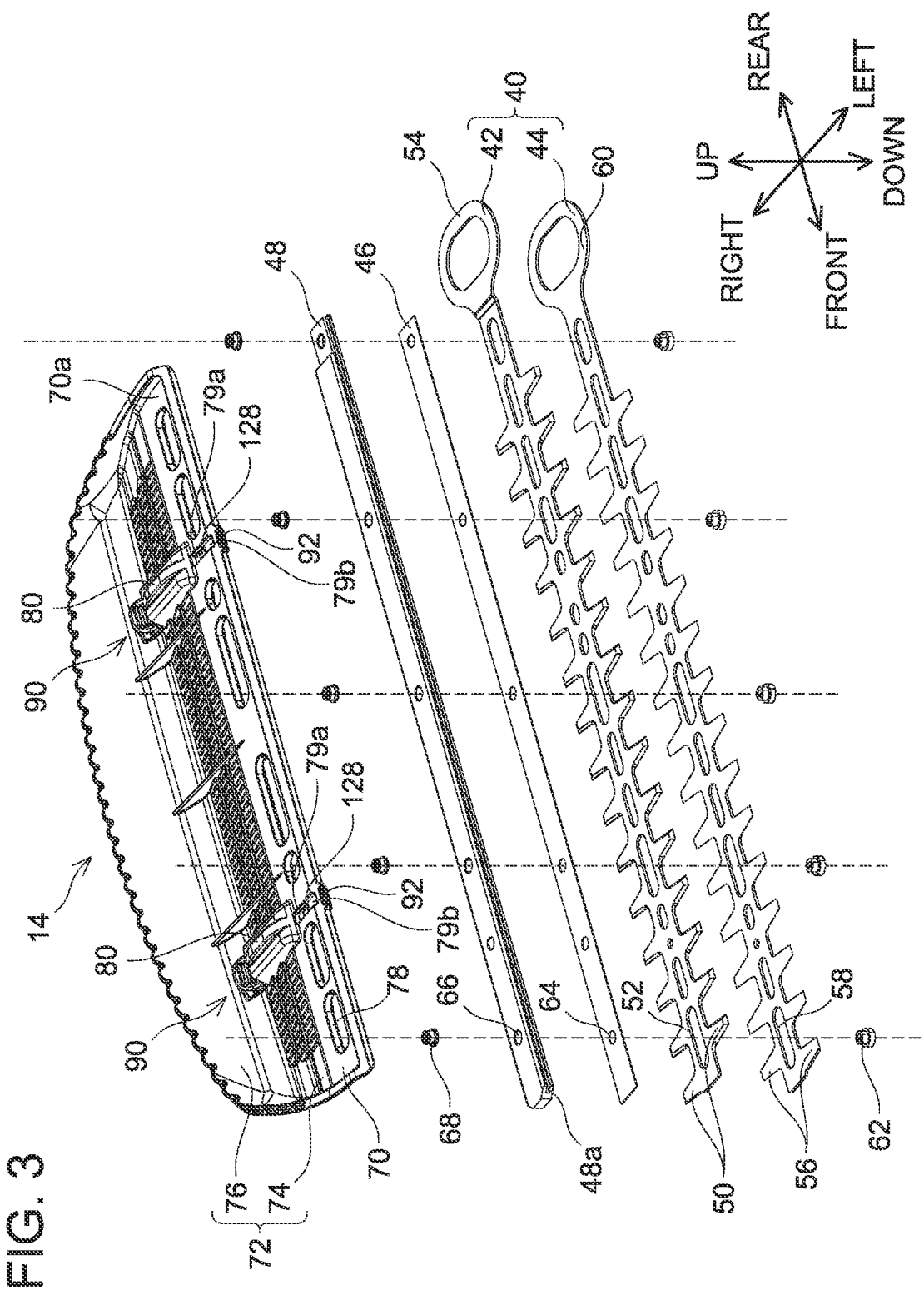
FIG. 3 is a disassembled view of a blade unit 12 and a chip receiver 14 of the embodiment.

The blade unit 12 extends frontward linearly from the body housing 10. As shown in FIG. 3, the blade unit 12 includes a pair of blades 40 including an upper blade 42 and a lower blade 44, a guide plate 46, and a guide bar 48.

A plurality of blade edges 50 is disposed on the upper blade 42 along the front-rear direction. The plurality of blade edges 50 is disposed on both left and right sides of the upper blade 42. That is, the upper blade 42 is a double-edged blade. A plurality of elongate holes 52 is defined in the upper blade 42. The plurality of elongate holes 52 is arranged along the front-rear direction, and a longitudinal direction of each elongate hole 52 extends along the front-rear direction. An upper connecting rod 54 is connected to a rear part of the upper blade 42. The upper connecting rod 54 is connected to the motor 28 (see FIG. 9) via a crank cam (not shown) in the body housing 10.

A plurality of blade edges 56 is disposed on the lower blade 44 along the front-rear direction. The plurality of blade edges 56 is disposed on both left and right sides of the lower blade 44. That is, the lower blade 44 is also a double-edged blade. Similarly, a plurality of elongate holes 58 is defined in the lower blade 44. The plurality of elongate holes 58 is also arranged along the front-rear direction, and a longitudinal direction of each elongate hole 58 extends along the front-rear direction. Guide members 62 are inserted into the elongate holes 52 of the upper blade 42 and the elongate holes 58 of the lower blade 44 to guide reciprocal motions of the upper blade 42 and the lower blade 44. A length of each guide member 62 in the left-right direction is slightly smaller than a length of each of the elongate holes 52, 58 in the left-right direction. A lower connecting rod 60 is connected to a rear part of the lower blade 44. The lower connecting rod 60 is also connected to the motor 28 (see FIG. 9) via the crank cam (not shown) in the body housing 10.

A plurality of holes 64 through which bolts 69 (see FIG. 2) pass is defined in the guide plate 46. A plurality of holes 66 through which the bolts 69 (see FIG. 2) pass is defined in the guide bar 48. A left engagement groove 48a extending in the front-rear direction is defined in a left side surface of the guide bar 48. A right engagement groove 48b (see FIG. 5) extending in the front-rear direction is likewise defined in a right side surface of the guide bar 48. The guide plate 46 is fixed to the guide bar 48 by nuts 68 and the bolts 69 (see FIG. 2). Further, the pair of blades 40 is attached to the guide plate 46 by the nuts 68 and the bolts 69 (see FIG. 2). Moreover, the guide plate 46 and the guide bar 48 are fixed to the body housing 10 (more specifically, the front-extending part 10a) by the nut 68 and the bolt 69 on the rearmost side (see FIG. 2).

(Configuration of Chip Receiver 14)

Figure 4:
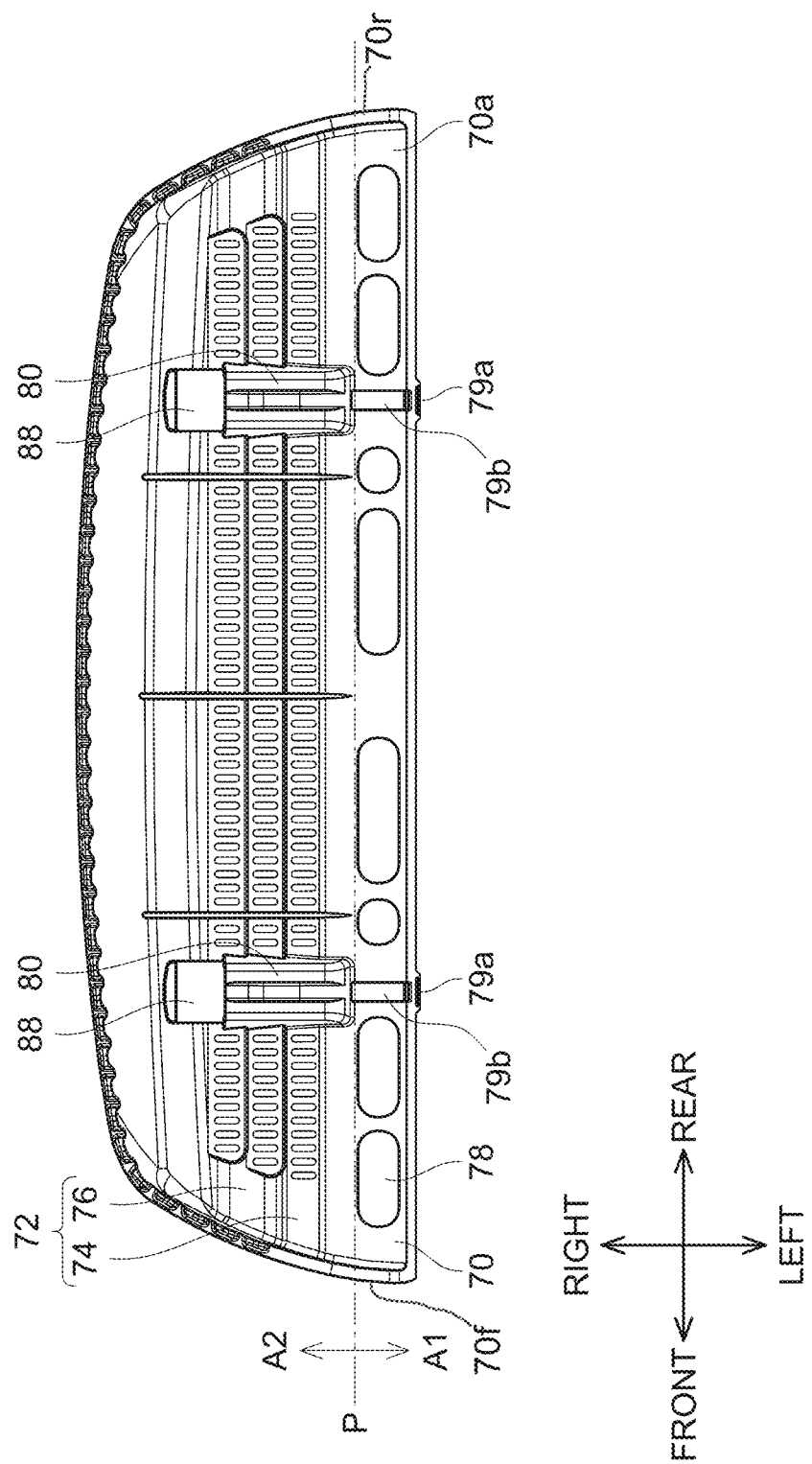
FIG. 4 is a top view of the chip receiver 14 of the embodiment as viewed from above.
Figure 5:
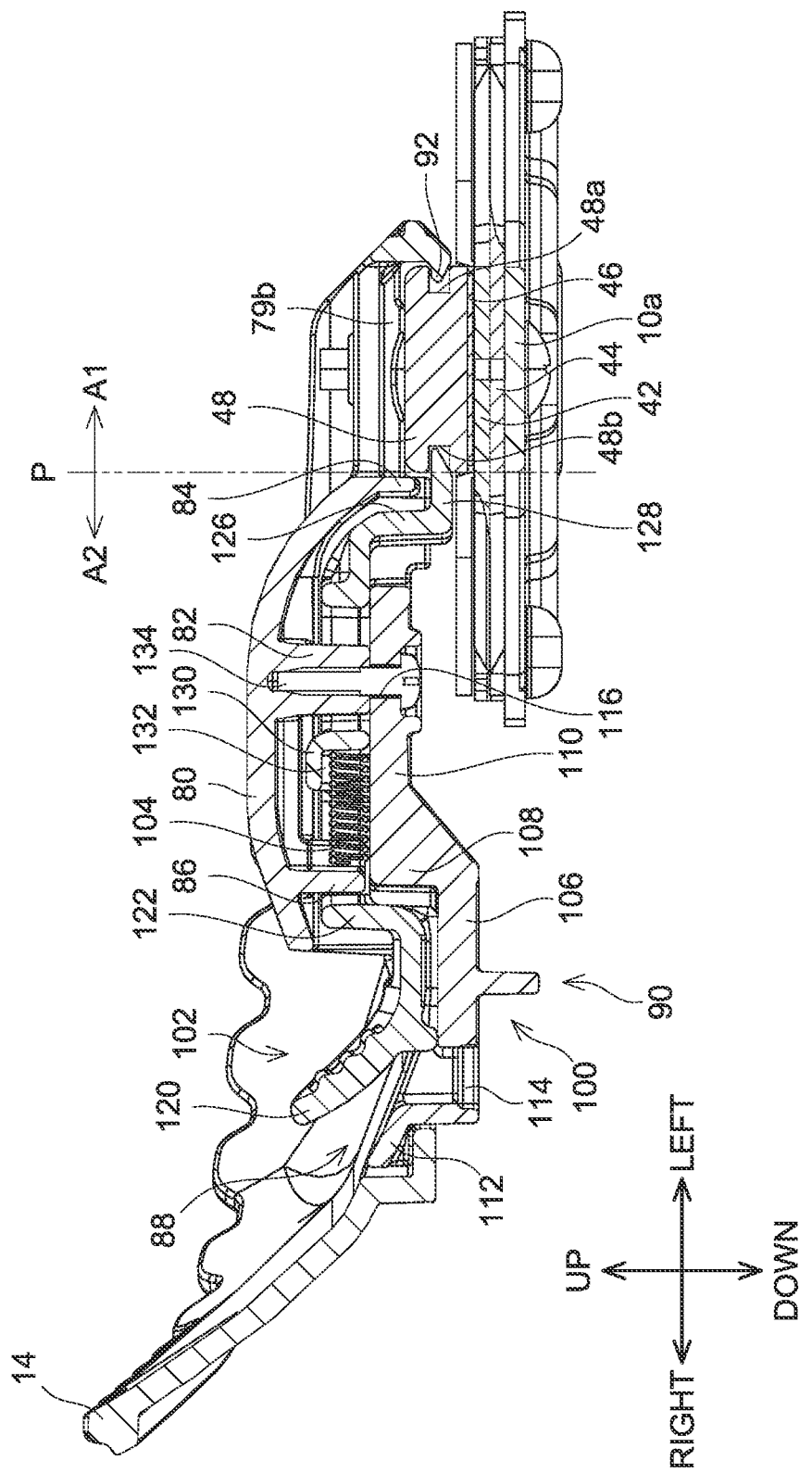
FIG. 5 is a cross-sectional view of the chip receiver 14 of the embodiment as viewed from the front side.

The chip receiver 14 includes a base part 70 and a receiving part 72. Hereinbelow, an explanation is given with an example where the receiving part 72 of the chip receiver 14 is located on the right side of the blade unit 12 as shown in FIGS. 1 and 2. Here, the base part 70 refers to a part of the chip receiver 14 disposed on an upper surface of the guide bar 48. Specifically speaking, as shown in FIGS. 4 and 5, the part of the chip receiver 14 on the A1 side with respect to a plane P (on the left side in the present embodiment) is termed the base part 70. The plane P is a plane that expands in the up-down direction and the front-rear direction and passes the right end of the guide bar 48. Further, a part of the chip receiver 14 that is on the A2 side with respect to the plane P (on the right side in the present embodiment) is termed the receiving part 72. A plurality of elongate holes 78 is defined in the base part 70. The plurality of elongate holes 78 is arranged along the front-rear direction, and a longitudinal direction of each elongate hole 78 extends along the front-rear direction. A length of each elongate hole 78 in the left-right direction is slightly larger than a length of each nut 68 in the left-right direction. An upper surface of the base part 70 includes a flat part 70a that is parallel to a plane expanding in the front-rear direction and the left-right direction and, in the front-rear direction, a frontmost side of the base part 70 has a front wall 70f and a rearmost side of the base part 70 has a rear wall 70r. The base part 70 does not have a protruding part that protrudes to a higher level than the flat part 70a, such that an entirety of an upper surface of the base part 70 that extends from the front wall 70f to the rear wall 70r is flat. Further, two recesses 79a that are indented downward are defined in the base part 70. Through holes 79b penetrating the recesses 79a in the up-down direction are defined in the recesses 79a. In a variant, a rib or a protruding part with a size that does not interrupt the branches and leaves cut by the pair of blades 40 from entering the receiving part 72 may be disposed on the upper surface of the base part 70. For example, in the case where a rib extending in the left-right direction is disposed on the upper surface of the base part 70, the size of the rib in the up-down direction is preferably twice a thickness of the base part 70 or less, and the size of the rib in the front-rear direction is half the thickness of the base part 70 or less. The rib with such a size does not interrupt the branches and leaves cut by the pair of blades 40 from entering the receiving part 72.

The receiving part 72 includes a right extending part 74 extending rightward from the base part 70 and an upper extending part 76 extending upward from the right end of the right extending part 74. Two protruding parts 80 protruding upward are disposed at the receiving part 72. The two protruding parts 80 are arranged along the front-rear direction. The two protruding parts 80 are disposed on the right side of the recesses 79a of the base part 70. As shown in FIG. 5, the protruding parts 80 extend in the left-right direction and have a bulging shape bulging upward from the right extending part 74. A boss 82 opening downward is disposed on each of the protruding parts 80. A first downwardly extending part 84 extending downward is disposed at the left end of each of the protruding parts 80. A second downwardly extending part 86 extending downward is disposed in a vicinity of the right end of each of the protruding parts 80. An opening 88 is defined in the receiving part 72 on the right side of each of the protruding parts 80.

Figure 6:
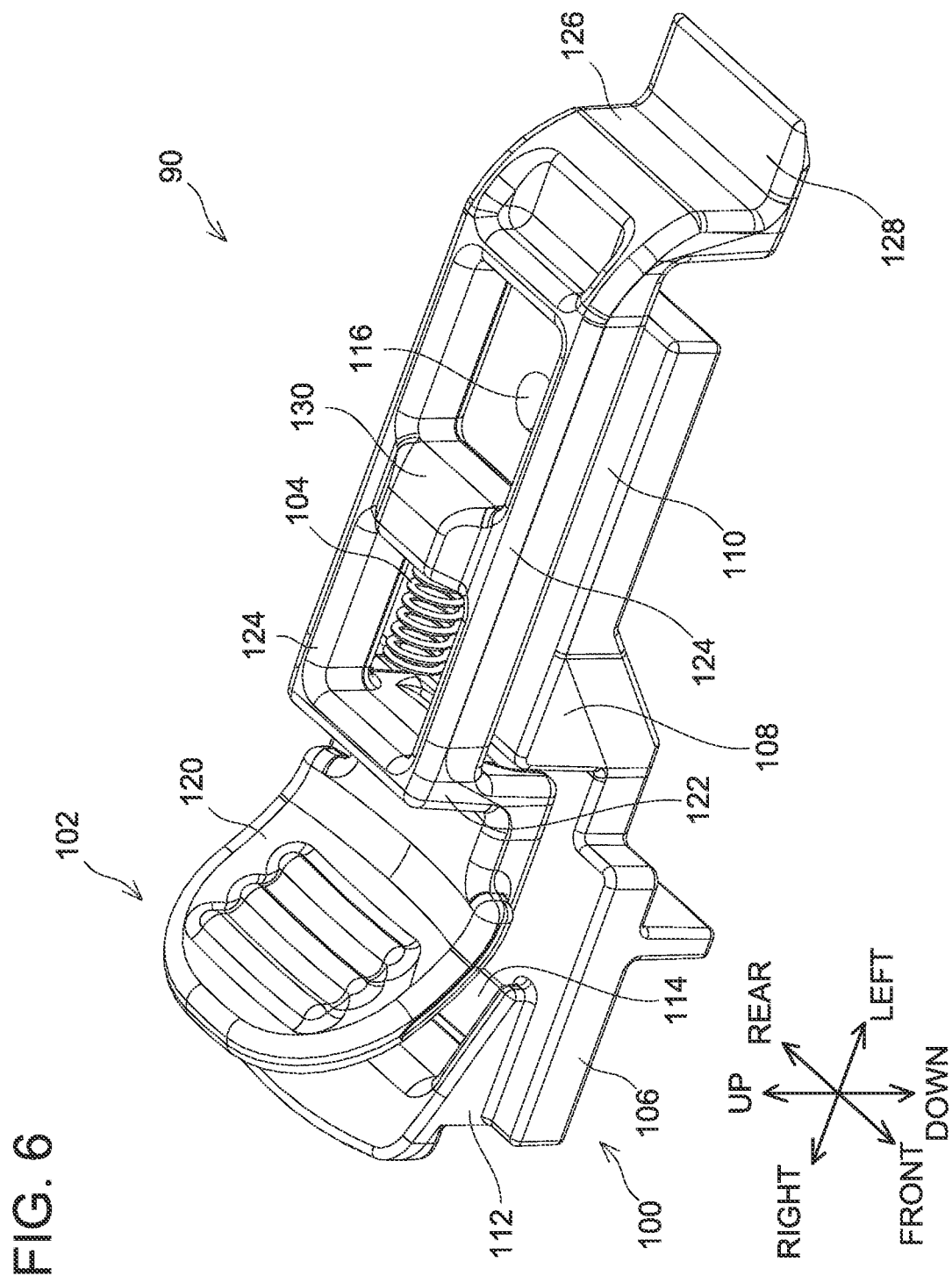
FIG. 6 is a perspective view of an attachment part 90 of the embodiment as viewed from the upper front left side.

As shown in FIG. 3, the chip receiver 14 further includes two attachment parts 90. The two attachment parts 90 are arranged along the front-rear direction. The two attachment parts 90 are arranged at positions corresponding to the two protruding parts 80 of the receiving part 72. As shown in FIGS. 5 and 6, the attachment parts 90 each include a first engaging part 92, a supporting part 100, a movable part 102, and a spring 104. Each first engaging part 92 is integrated with the base part 70. Each supporting part 100 includes a first flat part 106, a step part 108, and a second flat part 110. Further, the first flat part 106, the step part 108, and the second flat part 110 are disposed in this order from the right side. The step part 108 connects the left end of the first flat part 106 to the right end of the second flat part 110. The second flat part 110 is located at a higher level than the first flat part 106. A curved part 112 is disposed in a vicinity of the right end of the first flat part 106. The curved part 112 curves upward from the left side toward the right side. An opening 114 is defined at a lower portion of the curved part 112. The opening 114 is an opening for suppressing branches and leaves from staying on the right side of the movable part 102. A bolt hole 116 is defined in the second flat part 110. In the state where the supporting part 100 is fixed to its corresponding protruding part 80, positions of the right end of the second flat part 110 and the right end of the second downwardly extending part 86 of the protruding part 80 substantially match. The supporting part 100 is fixed to its corresponding protruding part 80 by threadedly engaging a bolt 134 onto the bolt hole 116 and the boss 82 in the state where the movable part 102 and the spring 104 are mounted on their corresponding supporting part 100.

Figure 7:
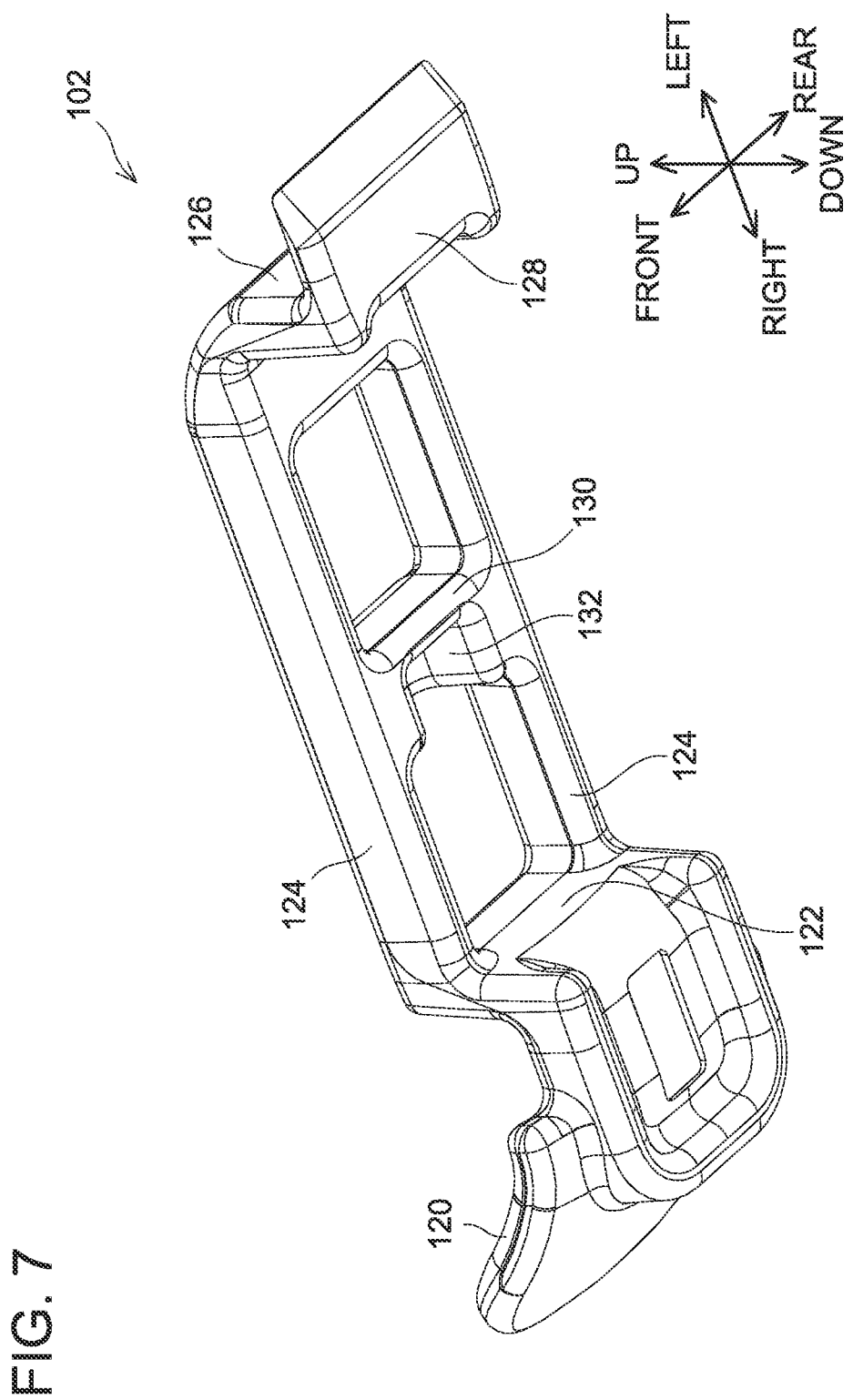
FIG. 7 is a perspective view of a movable part 102 of the embodiment as viewed from the lower front left side.

As shown in FIG. 6, the movable part 102 includes a manipulation part 120, a first step part 122, leftwardly extending parts 124 extending leftward from both front and rear ends of the first step part 122, a second step part 126, and a second engaging part 128. The manipulation part 120, the first step part 122, the leftwardly extending parts 124, the second step part 126, and the second engaging part 128 are disposed in this order from the right side. The first step part 122 connects the manipulation part 120 and the right ends of the leftwardly extending parts 124. The leftwardly extending parts 124 are located at a higher level than the manipulation part 120. The second step part 126 connects the left ends of the leftwardly extending parts 124 and the second engaging part 128. The leftwardly extending parts 124 are located at a higher level than the second engaging part 128. The manipulation part 120 is a member which the user can manipulate, and is curved upward from the left side toward the right side. A connecting part 130 that connects the front and rear leftwardly extending parts 124 is disposed between the first step part 122 and the second step part 126. As shown in FIG. 7, a recess 132 is defined at a lower part of the connecting part 130. A size of the recess 132 in the front-rear direction is slightly larger than a size of the spring 104 in the front-rear direction. As shown in FIG. 5, a housing unit for the spring 104 is defined by the second downwardly extending part 86 of its corresponding protruding part 80, the second flat part 110 of the corresponding supporting part 100, and the recess 132 of the corresponding movable part 102. The right end of the spring 104 contacts the second downwardly extending part 86 of the protruding part 80, and the left end of the spring 104 contacts the left end of the recess 132 of the movable part 102. The second engaging part 128 engages with the right engagement groove 48b of the guide bar 48. The user can move the movable part 102 in the left-right direction with respect to the protruding part 80 and the supporting part 100 by manipulating the manipulation part 120 in the left-right direction. By moving the movable part 102 in the left-right direction, switch between an engaging position at which the second engaging part 128 is engaged with the right engagement groove 48b (position of FIG. 5) and a non-engaging position at which the second engaging part 128 is not engaged with the right engagement groove 48b (position of FIG. 8) can be realized. The second engaging part 128 is biased to the engaging position (see FIG. 5) by the spring 104 in a normal state. Specifically, the movable part 102 is biased by the spring 104 leftward with respect to the protruding part 80 and the supporting part 100, by which the second engaging part 128 is biased to the engaging position. The user can visually recognize operations of each of the second engaging parts 128 through the through holes 79b of the base part 70.

Figure 8:
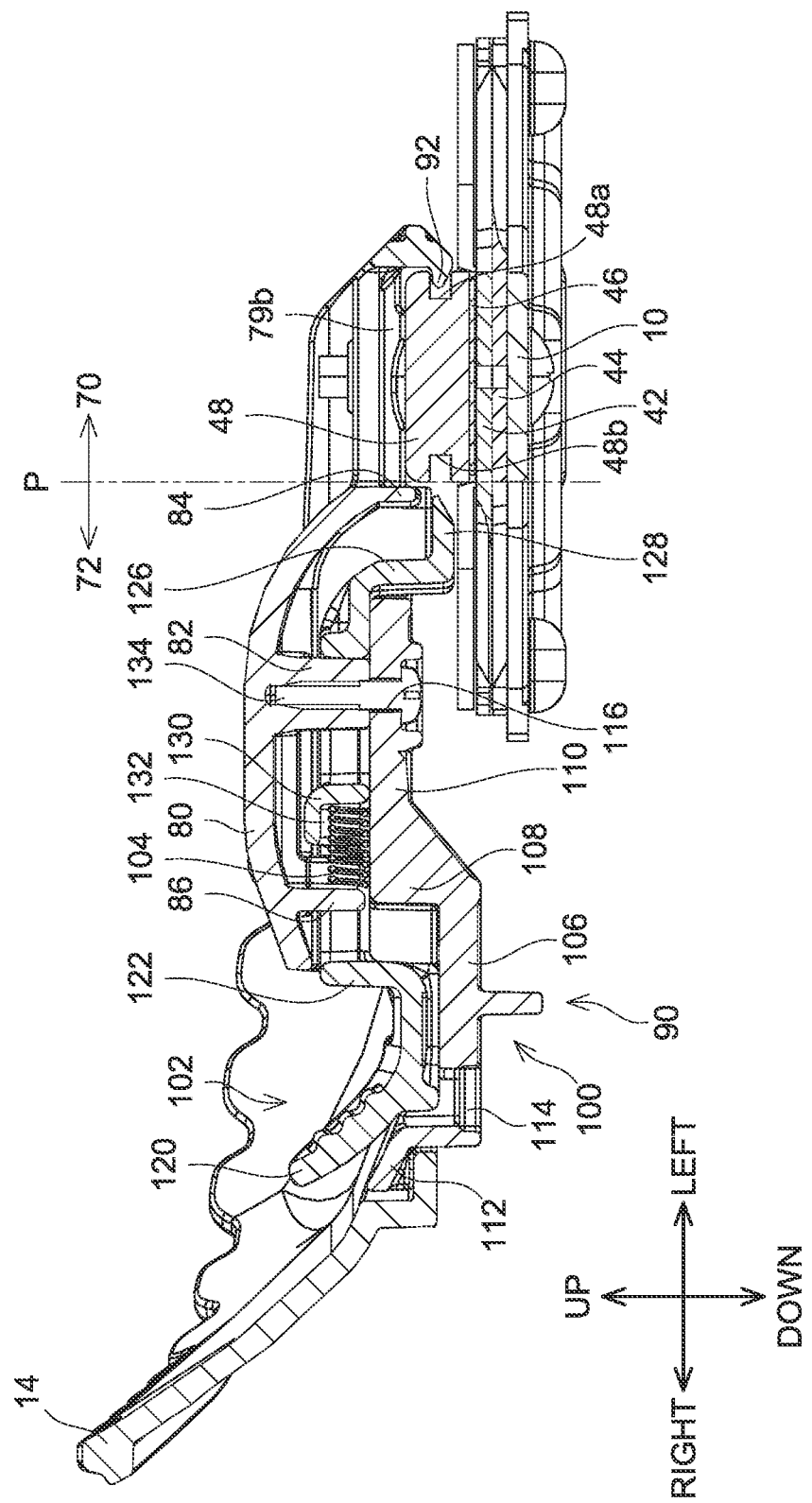
FIG. 8 is a cross-sectional view of the chip receiver 14 of the embodiment as viewed from the front side.

Next, a procedure to attach the chip receiver 14 to the guide bar 48 will be described with reference to FIGS. 5 and 8. The user can attach the chip receiver 14 to the guide bar 48 by performing the following procedure simultaneously on the two attachment parts 90. Hereinbelow, the explanation will be given with an example of the procedure performed on the rear-side attachment part 90.

Firstly, the user moves the manipulation part 120 of the attachment part 90 rightward. Then, the user brings the base part 70 onto the guide bar 48, and engages the first engaging part 92 of the base part 70 with the left engagement groove 48a of the guide bar 48. Due to this, as shown in FIG. 8, the left end of the second engaging part 128 is positioned under the first downwardly extending part 84 of the protruding part 80. Then, the user releases his/her finger from the manipulation part 120. In this case, as shown in FIG. 5, the movable part 102 moves leftward with respect to the protruding part 80 and the supporting part 100 by biasing force of the spring 104. Then, the second engaging part 128 engages with the right engagement groove 48b of the guide bar 48. Due to this, the first engaging part 92 is engaged with the left engagement groove 48a and the second engaging part 128 is engaged with the right engagement groove 48b. The chip receiver 14 can be attached to the guide bar 48 by performing such a procedure simultaneously on the two attachment parts 90. The foregoing explanation on the procedure to attach the chip receiver 14 to the guide bar 48 was given based on the case where the first engaging part 92 is engaged with the left engagement groove 48a and the second engaging part 128 is engaged with the right engagement groove 48b, however, in the hedge trimmer 2 of the present embodiment, the chip receiver 14 can also be attached to the guide bar 48 by engaging the first engaging part 92 with the right engagement groove 48b and engaging the second engaging part 128 with the left engagement groove 48a. In this case, the receiving part 72 of the chip receiver 14 is arranged on the left side of the guide bar 48. The user can cut the branches and leaves by using the right blade edges 50, 56 of the upper blade 42 and the lower blade 44.

Next, a procedure to detach the chip receiver 14 from the guide bar 48 will be described with reference to FIGS. 5 and 8. The user can detach the chip receiver 14 from the guide bar 48 by performing the following procedure simultaneously on the two attachment parts 90. Hereinbelow, the explanation will be given on the procedure performed on the rear-side attachment part 90.

Firstly, the user moves the manipulation part 120 rightward. Due to this, as shown in FIG. 8, the second engaging part 128 moves from the engaging position to the non-engaging position. That is, engagement of the second engaging part 128 and the right engagement groove 48b is released. Then, the user tilts the chip receiver 14 with respect to the guide bar 48 and releases engagement of the first engaging part 92 and the left engagement groove 48a. Then, the user moves the chip receiver 14 upward. The chip receiver 14 can be detached from the guide bar 48 by performing such a procedure simultaneously on the two attachment parts 90. In the hedge trimmer 2 of the present embodiment, operation to detach the chip receiver 14 from the guide bars 48 needs to be performed simultaneously on the two attachment parts 90. For example, the user needs to manipulate the front attachment part 90 with his/her right hand and also manipulate the rear attachment part 90 with his/her left hand. According to such a configuration, the operation for detaching the chip receiver 14 from the guide bar 48 can be suppressed from being performed in the state where the actuation lever 26 of the hedge trimmer 2 is being manipulated, that is, in the state where the pair of blades 40 is actuated. Thus, safety of the user who uses the hedge trimmer 2 can be improved.

Figure 10:
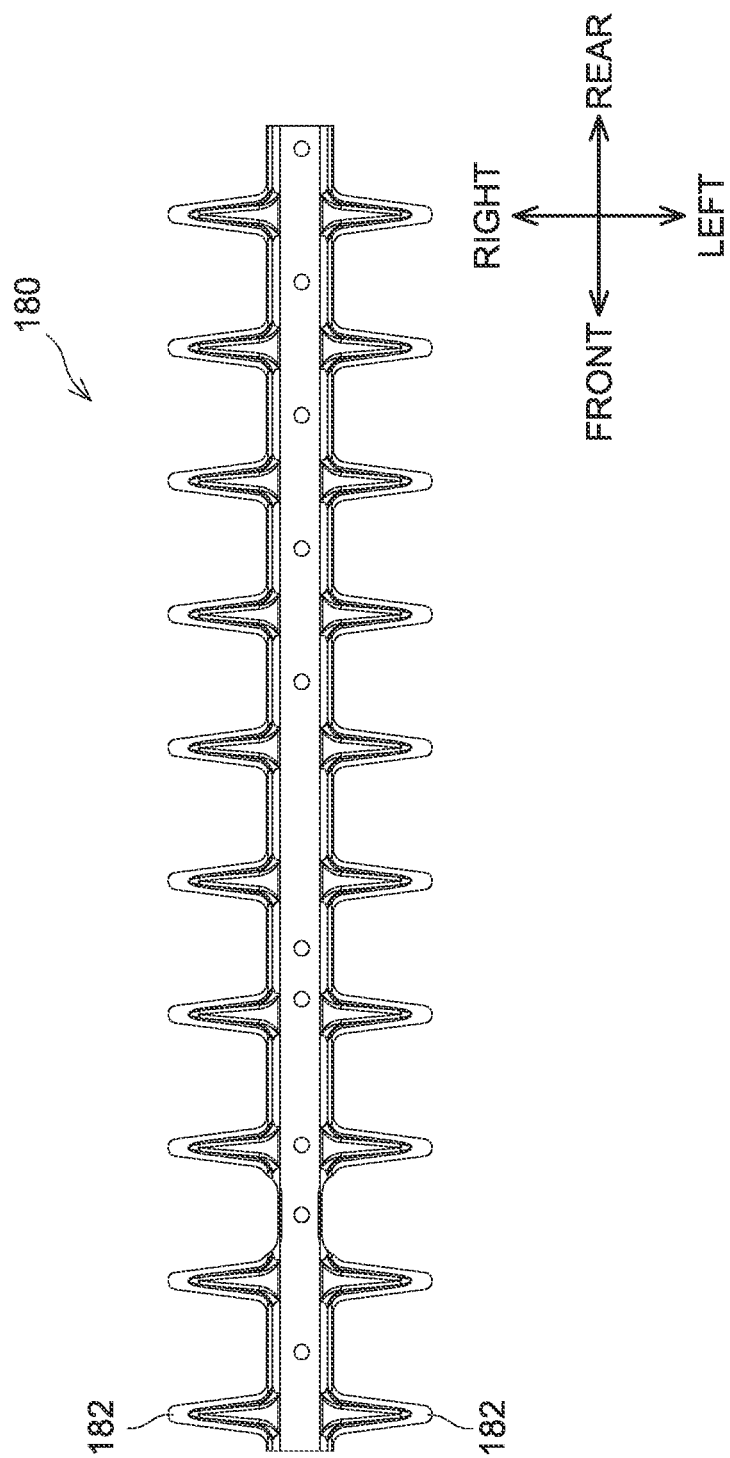
FIG. 10 is a top view of a guard 180 configured to be attached to the hedge trimmer 2 of the embodiment as viewed from above.

Further, in the hedge trimmer 2 of the present embodiment, a guard 180 can be attached between the guide bar 48 and the base part 70 of the chip receiver 14, for example. As shown in FIG. 10, the guard 180 has a plurality of guard members 182 disposed along the front-rear direction. The plurality of guard members 182 is disposed on both left and right sides of the guard 180. The guard 180 suppresses a relatively large object from contacting the plurality of blade edges 50 of the upper blade 42 and the plurality of blade edges 56 of the lower blade 44. Each of the attachment parts 90 of the chip receiver 14 is configured to be disposed between two guard members 182 arranged adjacently in the front-rear direction in the state where the chip receiver 14 and the guard 180 are attached to the guide bar 48.

In one or more embodiments, the hedge trimmer 2 comprises the body housing 10, the guide bar 48 (an example of "fixed plate") attached to the body housing 10 and extending forward from the front part of the body housing 10, the pair of blades 40 attached to the guide bar 48, configured to be movable in the front-rear direction and extending forward from the front part of the body housing 10, and the chip receiver 14 detachably attached to the guide bar 48, as shown in FIGS. 1 to 9. The left engagement groove 48a (an example of "first engaged part") is disposed on the left side surface (an example of "first side surface") of the guide bar 48, and the right engagement groove 48b (an example of "second engaged part") is disposed on the right side surface (an example of "second side surface") of the guide bar 48. The chip receiver 14 comprises the base part 70 mounted on the guide bar 48, the receiving part 72 connected to the base part 70 and configured to receive the cut branches and leaves, and the attachment parts 90 configured to attach the chip receiver 14 to the guide bar 48. The attachment parts 90 each comprise the first engaging part 92 fixed to the base part 70 and configured to engage with the left engagement groove 48a, the second engaging part 128 supported by the receiving part 72 and configured to be movable between the engaging position (see FIG. 5) in which it is engaged with the right engagement groove 48b and the non-engaging position (see FIG. 8) in which it is not engaged with the right engagement groove 48b, and the manipulation part 120 configured to move the second engaging part 128 from the engaging position to the non-engaging position in response to the user operation. The upper surface of the base part 70 is flat. Especially in the present embodiment, any protruding part protruding to a higher level than the upper surface of the base part 70 is not disposed on the upper surface of the base part 70. According to the above configuration, due to the upper surface of the base part 70 being flat, the branches and leaves cut by the pair of blades 40 are not interrupted from entering the receiving part 72. Thus, most of the branches and leaves cut by the pair of blades 40 can be received by the receiving part 72. As a result of this, the amounts of the branches and leaves that scatter on the ground can be reduced.

Further, in one or more embodiments, the manipulation part 120 is disposed at the receiving part 72 of the chip receiver 14. In a configuration in which the manipulation part 120 is disposed at the base part 70, it is possible that the branches and leaves cut by the pair of blades 40 collide with the manipulation part 120 and the branches and leaves that collided with the manipulation part 120 scatter on the ground. According to the above configuration, the branches and leaves cut by the pair of blades 40 can be suppressed from colliding with the manipulation part 120 before they enter the receiving part 72. Thus, amounts of branches and leaves that scatter on the ground can be reduced. Further, in the configuration in which the manipulation part 120 is disposed at the base part 70, it is possible that branches come into contact with the manipulation part 120 during trimming and the second engaging part 128 is thereby moved from the engaging position to the non-engaging position. If this happens, the chip receiver 14 would be detached from the guide bar 48 during the trimming. According to the above configuration, the branches can be suppressed from coming into contact with the manipulation part 120 during the trimming. Thus, the chip receiver 14 can be suppressed from detaching from the guide bar 48 during the trimming.

Further, in one or more embodiments, the receiving part 72 is disposed on the right side surface side with respect to the base part 70, and the second engaging part 128 is disposed at the receiving part 72 of the chip receiver 14. The branches and leaves cut by the pair of blades 40 are more likely to collide with the base part 70 when the thickness of the base part 70 is larger, and the amounts of the branches and leaves that scatter on the ground would thereby increase. Due to this, it is desirable that the thickness of the base part 70 is small. If the manipulation part 120 is disposed at the receiving part 72 and the second engaging part 128 is disposed at the base part 70, a coupling part for coupling the manipulation part 120 and the second engaging part 128 needs to be provided at the base part 70, as a result of which the thickness of the base part 70 becomes larger by a size of the coupling part. According to the above configuration, there is no need to dispose the coupling part at the base part 70 for coupling the manipulation part 120 with the second engaging part 128. Due to this, the thickness of the base part 70 can be made small. Thus, the amounts of the branches and leaves coming into contact with the base part 70 can be reduced, and the amounts of the branches and leaves that scatter on the ground can be reduced.

Further, in one or more embodiments, the first engaging part 92 is integrally formed with the base part 70. If the first engaging part 92 is fixed to the base part 70 via bolt(s) or the like, bolt hole(s) need to be defined in the base part 70, and the thickness of the base part 70 becomes larger. According to the above configuration, there is no need to define the bolt hole(s) in the base part 70. Due to this, the thickness of the base part 70 can be made small. Thus, the amounts of the branches and leaves coming into contact with the base part 70 can be reduced, and the amounts of the branches and leaves that scatter on the ground can be reduced. Further, since no bolt(s) need to be used, the number of components of the hedge trimmer 2 can be reduced.

Further, in one or more embodiments, the manipulation part 120 is configured to be manipulable along the left-right direction, and the second engaging part 128 moves along the left-right direction when the manipulation part 120 is manipulated along the left-right direction. According to the above configuration, the direction along which the manipulation part 120 is manipulated matches the direction along which the second engaging part 128 moves. Due to this, the user can easily recognize the moving direction of the second engaging part 128. Thus, manipulation for the user who uses the hedge trimmer 2 can be improved.

Figure 11:
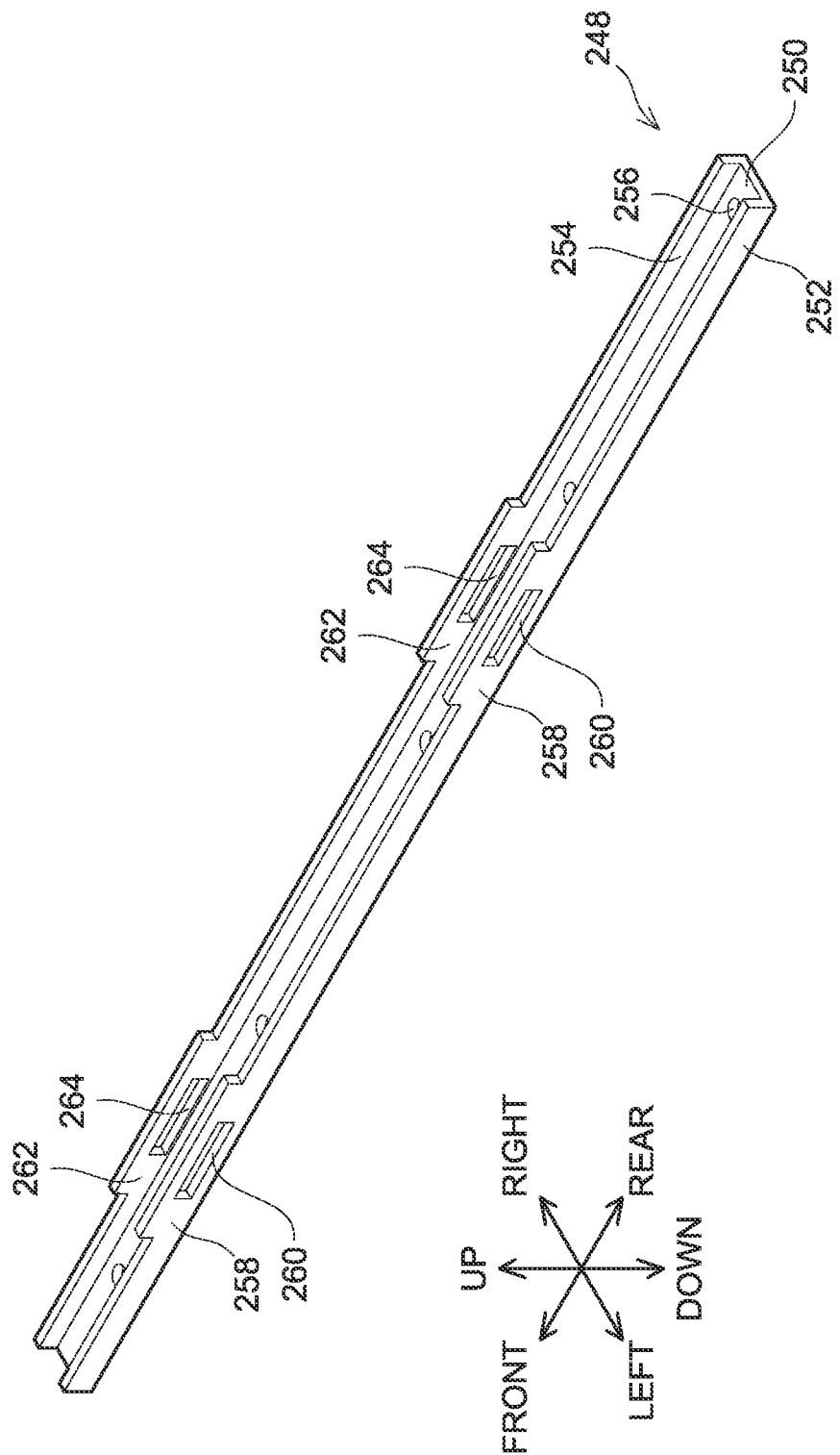
FIG. 11 is a perspective view of a guide bar 248 of a variant as viewed from the upper rear left side.

(First Variant) A guide bar 248 of FIG. 11 may be employed as a replacement to the guide bar 48 of the embodiment. The guide bar 248 includes a bottom wall 250, a left wall 252, and a right wall 254. The left wall 252 extends upward from the left end of the bottom wall 250. The right wall 254 extends upward from the right end of the bottom wall 250. A plurality of holes 256 is defined in the bottom wall 250. The plurality of holes 256 is arranged along the front-rear direction. Two upwardly protruding parts 258 are disposed on the left wall 252. A left engagement hole 260 is defined in each of the upwardly protruding parts 258. Two upwardly protruding parts 262 are disposed on the right wall 254. A right engagement hole 264 is defined in each of the upwardly protruding parts 262. For example, the chip receiver 14 can be attached to the guide bar 248 by engaging the first engaging parts 92 of the attachment parts 90 to the left engagement holes 260 and engaging the second engaging parts 128 of the attachment parts 90 with the right engagement holes 264. In this variant, the left engagement holes 260 and the right engagement holes 264 are respectively examples of "first engaged part", and "second engaged part".

(Second Variant) The manipulation parts 120 may be disposed at the base part 70.

(Third Variant) The manipulation parts 120 and the second engaging parts 128 may be disposed at the base part 70 and the first engaging parts 92 may be disposed at the receiving part 72.

(Fourth Variant) The base part 70 and the first engaging parts 92 may be configured separately. In this case, the first engaging parts 92 may be fixed to the base part 70 by bolt(s).

(Fifth Variant) The first engaging parts 92 may be fixed to the receiving part 72.

(Sixth Variant) The pair of blades 40 may be single-edged blades having the blade edges only on the left or right side.

(Seventh Variant) The chip receiver 14 may include only one attachment part 90, or may include three or more attachment parts 90.

What is claimed is:

1. A hedge trimmer comprising:
a body housing;
a fixed plate attached to the body housing and extending forward from a front part of the body housing, and;
a blade attached to the fixed plate, configured to be movable in a front-rear direction with respect to the fixed plate and extending forward from the front part of the body housing; and
a chip receiver detachably attached to the fixed plate,
wherein the fixed plate has, in a left-right direction, a first side surface defining a first engaged part and a second side surface opposed to the first side surface and defining a second engaged part,
wherein the chip receiver comprises:
 a base part mounted on the fixed plate, wherein, in the front-rear direction, a frontmost side of the base part has a front wall and a rearmost side of the base part has a rear wall;
 a receiving part connected to the base part and configured to receive cut branches and leaves;
 a first engaging portion fixed to the base part and configured to engage with the first engaged part of the fixed plate;
 a second engaging portion disposed on the receiving part and configured to be movable between an engaging position in which the second engaging portion is engaged with the second engaged part of the fixed plate and a non-engaging position in which the second engaging portion is not engaged with the second engaged part of the fixed plate; and
 a manipulation part configured to move the second engaging portion from the engaging position to the non-engaging position in response to a user operation,
wherein an entirety of an upper surface of the base part that extends from the front wall to the rear wall of the base part is flat without a protruding part that protrudes from the upper surface.

2. The hedge trimmer according to claim 1, wherein the manipulation part is disposed on the receiving part.

3. The hedge trimmer according to claim 2, wherein an imaginary plane passes through the chip receiver in an up-down direction, at a junction of the receiving part and the base part of the chip receiver.

4. The hedge trimmer according to claim 1, wherein the first engaging portion is integrally formed with the base part.

5. The hedge trimmer according to claim 1, wherein the manipulation part is configured to be manipulable along a first direction orthogonal to the front-rear direction, and
the second engaging portion is configured to move along the first direction when the manipulation part is manipulated in the first direction.

6. A hedge trimmer comprising:
a body housing;
a fixed plate attached to the body housing and extending forward from a front part of the body housing;
a blade attached to the fixed plate, configured to be movable in a front-rear direction with respect to the fixed plate and extending forward from the front part of the body housing; and
a chip receiver detachably attached to the fixed plate,
wherein the fixed plate has, in a left-right direction, a first side surface defining a first engaged part and a second side surface opposed to the first side surface and defining a second engaged part wherein the chip receiver comprises:
- a base part mounted on the fixed plate, wherein, in the front-rear direction, a frontmost side of the base part has a front wall and a rearmost side of the base part has a rear wall;
- a receiving part connected to the base part and configured to receive cut branches and leaves;
- a first engaging portion fixed to the base part and configured to engage with the first engaged part of the fixed plate,
- a second engaging portion disposed on the receiving part and configured to be movable between an engaging position in which the second engaging portion engages with the second engaged part of the fixed plate and a non-engaging position in which the second engaging portion does not engage with the second engaged part of the fixed plate, and
- a manipulation part configured to move the second engaging portion from the engaging position to the non-engaging position in response to a user operation, wherein the manipulation part is disposed on the receiving part, wherein an imaginary plane passes through the chip receiver in an up-down direction, at a junction of the receiving part and the base part of the chip receiver, and wherein the first engaging portion is integrally formed with the base part, wherein the manipulation part is configured to be manipulable along a first direction orthogonal to the front-rear direction, and the second engaging portion is configured to move along the first direction when the manipulation part is manipulated in the first direction.

* * * * *